Sept. 13, 1966 R. DE PEIGNEFORT GALLOWAY ET AL 3,273,008

DYNAMIC CONVERGENCE SYSTEMS FOR COLOUR KINESCOPES

Filed June 17, 1963

United States Patent Office 3,273,008

Patented Sept. 13, 1966

3,273,008

DYNAMIC CONVERGENCE SYSTEMS FOR COLOUR KINESCOPES

Robert de Peignefort Galloway, Addlestone, Weybridge, Surrey, and Eric William Bull, Hounslow, Middlesex, England, assignors to Electric & Musical Industries Limited, Hayes, England, a company of Great Britain Filed June 17, 1963, Ser. No. 288,305
Claims priority, application Great Britain, June 20, 1962, 23,683/62
10 Claims. (Cl. 315—27)

Figure 1:
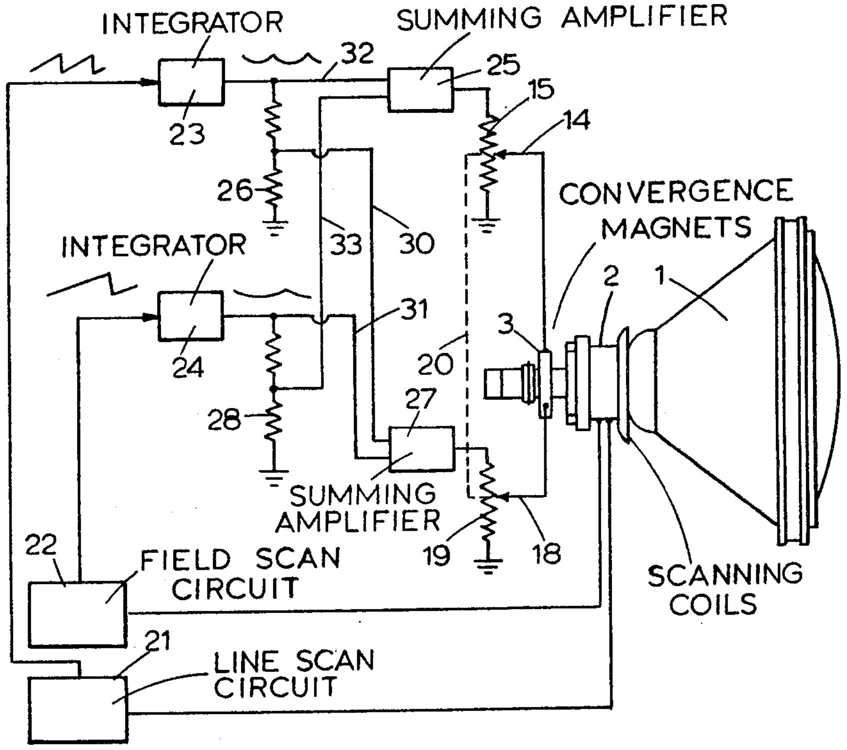

This invention relates to colour television apparatus and in particular to dynamic beam convergence circuits for use with three gun cathode ray tubes for display colour images such as are used in colour television receivers.

A practical colour television receiver usually employs a three gun shadow mask colour reproducing tube as described, for example in RCA Review, vol. XVI, March 1955, page 122 onwards. To ensure correct operation of such a tube, three beams should ideally converge together in the vicinity of the luminescent screen for all angles of deflection. However, if the tube is set up to give correct convergence of the three beams in a central area of the screen, the convergence in outer areas of the screen tends to become inexact as a result of electron optical aberrations. Factors which cause such aberrations are curvature of the beam focussing field, astigmatism of the deflecting system and curvature of the screen. To reduce the convergence errors, it is usual to provide circuits for producting so-called dynamic convergence of the beams. These circuits provide deflecting fields of suitable waveform, one for each of the three guns, by feeding currents to electromagnets positioned so as to displace the beams from the respective guns in dependence upon the line and frame deflections. However, dynamic convergence circuits as proposed hitherto usually have a large number of controls (see for example, RCA Review, vol. XVI, March 1955, pages 140 to 169), the action of which is to some extent interdependent and can only be operated by those skilled in the art, whereas it is obviously desirable to reduce the number of controls to a minimum and to make them of such a character that they can be used by the unskilled.

The object of the present invention is to provide an improved dynamic convergence circuit for a colour display tube with a view to reducing the number of controls which are needed to obtain optimum dynamic convergence and to reducing interaction between said controls.

According to the present invention there is provided a circuit arrangement for controlling the dynamic convergence of a three gun cathode ray tube for displaying colour images comprising electromagnetic means associated with each gun which when energised by convergence currents set up magnetic fields causing convergence movement of the beam from each of said guns, means for developing and feeding to said electromagnetic means convergence currents including components of line and frame scanning frequencies, control means for controlling the relative amplitudes of the magnetic field components set up by said components of line and frame frequencies and further control means for controlling the amplitude of the resultant magnetic fields set up by said convergence currents substantially without changing the relative amplitudes of said magnetic field components.

Figure 2:
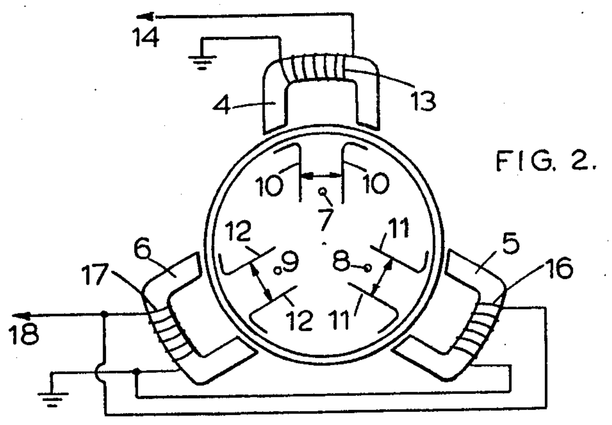

In order that the said invention may be clearly understood and readily carried into effect, it will now be described with reference to the accompanying drawings, in which:

FIGURE 1 illustrates part of a colour television receiver having a three gun shadow mask reproducing tube, and a convergence circuit in accordance with one example of the present invention, and FIGURE 2 illustrates a detail of part of the arrangement shown in FIGURE 1.

Referring to the drawings, the illustration of the colour television receiver has been confined to those parts which are necessary for an understanding of the invention. The reproducing tube 1 of the receiver is, in this example, a three gun shadow mask tube of type 21AXP22 manufactured by Radio Corporation of America, and the line and frame scanning coils for the tube are mounted on a screening yoke 2 of type 79605, also manufactured by Radio Corporation of America. A convergence magnet arrangement 3, for example, of the type illustrated and described on pages 158–9 of the aforementioned RCA Review, is applied to the neck of the tube 1 so that it is effective in the paths of the beams from the three guns, before the beams enter the field of the coils in the scanning yoke 2. It will be understood that the three guns in the tube are mounted so that their axes are equi-angularly spaced about the optical axis of the tube, and as shown in FIGURE 2, the convergence magnet arrangement 3 comprises three electromagnets 4, 5 and 6 individual respectively to the three guns. The small circles 7, 8 and 9 in FIGURE 2 represent cross sections of the beams from the three guns, and it will be assumed that 7 is the "blue" beam and 8 and 9 respectively the "red" and "green" beams. The electromagnets 4, 5 and 6 have horse-shoe shaped cores located outside the tube and have inwardly directed pole pieces 10, 11 and 12 inside the tube. The pole pieces 10 straddle the path of the beam 7, on its approach to the deflecting field, and similarly the pole pieces 11, 12 straddle the paths of the beams 8 and 9. The electromagnet 4 has an energising winding 13 which receives convergence current from the tap 14 on the potentiometer 15. The electromagnets 5 and 6 have energizing windings 16 and 17, connected in parallel which receive convergence current from the tap 18 on the potentiometer 19. When any one of the electromagnets 4, 5 or 6 is energised, a magnetic field is produced which is transverse to the axis of the respective beam 7, 8 or 9 as indicated by the arrows near the beams, and it will be understood that this magnetic field will produce a convergence movement of the beam in a radial plane containing the axis of the tube 1. This movement is of course distinct from the deflection of the beam produced by the scanning coils in the yoke 2.

The rectangles 21 and 22 represent the line and frame scanning circuits of the receiver, these circuits being conventional and generating line and frame sawtooth waveform currents which are applied to the respective coils in the yoke 2. The sawtooth waveforms generated by the circuits 21 and 22 are also applied to integrators 23 and 24 which produce parabolic waveforms of line and field frequency respectively. The parabolic voltage waveform of line frequency from 23 is applied across a potential divider 26 and also by the lead 32 to a summing amplifier 25. Similarly the frame frequency parabolic voltage waveform from the integrator 24 is applied across a potential divider 28 and also by the lead 31 to a summing amplifier 27. The voltage waveform at the adjustable tap on the potential divider 26 is applied by the lead 30 to the summing amplifier 27 and similarly the voltage waveform at the adjustable tap on the potential divider 28 is applied by the lead 33 to the summing amplifier 25. The adjustment of the taps on potential dividers 26 and 28 controls the relative amplitudes of the line and frame frequency components which are fed to the summing amplifiers 25 and 27. The summing amplifiers 25 and 27 therefore produce two output voltage waveforms, each of which is the sum of a number of similar components waveforms and which differ only in relative amplitudes of said component waveforms. These output voltage waveforms are applied as indicated across the aforesaid potentiometers 15 and 19, the sliders 14 and 18 of which are connected to windings on the electromagnets of said convergence magnet arrangement 3. Preferably these potentiometers are linear and the peak magnitudes of the convergence fields can then be controlled simultaneously by a manual control 20 which adjusts the positions of the taps 14 and 18 on the potentiometers 15 and 19 simultaneously without changing the waveform of the resultant fields.

The division ratios of the potential dividers 26 and 28 are determined by physical parameters of the tube and its associated deflecting coil system and therefore remain substantially constant. Consequently, when these ratios have been set up they will not in general require further adjustment and can be preset. These ratios may be determined by calculation. It can be shown that the current components appearing on the leads 30 to 33 can be represented respectively by the following four formulae which relate to the particular form of tube and scanning yoke referred to:

Lead 30.—Line frequency component of red and green convergence current $$\theta_x^2\left(\frac{1}{L_{ex}}+\frac{1}{L_{ax}}+\frac{2}{L}-\frac{1}{R}\right)$$

Lead 32.—Line frequency component of blue convergence current $$\theta_x^2\left(\frac{1}{L_{ex}}+\frac{2}{L_{ax}}-\frac{1}{L}-\frac{1}{R}\right)$$

Lead 31.—Frame frequency component of red and green convergence current $$\theta_y^2\left(\frac{1}{L_{ey}}+\frac{1}{L_{ay}}-\frac{1}{R}\right)$$

Lead 33.—Frame frequency component of the blue convergence current $$\theta_y^2\left(\frac{1}{L_{ey}}-\frac{2}{L_{ay}}+\frac{3}{L}-\frac{1}{R}\right)$$

L is the distance from the centre of deflection to the screen.
R is the radius of curvature of the screen.
$\theta_x$ and $\theta_y$ are the angles of deflection in the $x$ and $y$ coordinates (on the screen).

The quantities $L_{ax}$ and $L_{ex}$ are a measure of the astigmatism and curvature of field respectively of the scanning coils with reference to the horizontal deflection (line) of the beams and can be determined by experiment in known ways. Mathematically they can be expressed as follows:

$$2L_{ax}=f_{ax}\theta_x^2$$
$$2L_{ex}=f_{ex}\theta_x^2$$

where $f_{ax}$ is the focal length associated with astigmatism and $f_{ex}$ is the focal length associated with curvature of field. The constants $L_{ay}$ and $L_{ey}$ similarly refer to the vertical direction of deflection (frame). It will be observed that the expressions within the brackets in each formula are constants, determined by the design of the reproducing tube 1 and the scanning yoke 2.

Alternatively, the division ratios may be determined experimentally by adjusting potentiometers 26 and 28 while observing a colour pattern on the tube 1. The adjustments so determined can then be fixed.

When using only the horizontal bifilar windings associated with each electromagnet of the convergence magnet arrangement described on pages 158–9 of the aforementioned RCA Review, it was found in one case that good convergence could be obtained with the following peak amplitudes of the current components appearing in the windings of the convergence magnet system 3:

Red and Green (line) 5 ma.
Red and Green (frame) 6 ma.
Blue (line) 8 ma.
Blue (frame) Nil Thus the lead 33 was not connected. The convergence obtained was best along the middle vertical and middle horizontal of the picture, there being slight residual divergence at the corners.

If scanning coils having a cosinusoidal winding distribution are used, the constants $L_{ax}$ and $L_{ay}$ are equal and the constants $L_{ex}$ and $L_{ey}$ are also equal, and the astigmatism of the coils is radially symmetrical. In this case best convergence is again obtained by forming the blue convergence current from components of which the amplitudes differ from the corresponding components of the red and green convergence currents. Residual errors remain in the corners in this case also. If however, cosinusoidally wound coils are so located that $L=L_{ax}=L_{ay}$ all astigmatism is eliminated and an anastigmatic system is obtained. In such a case, bearing in mind that $L_{ex}=L_{ey}$, all the expressions in the brackets are of equal value, so that best convergence can be obtained when all line frequency components applied to the summing amplifiers 25 and 27 are of equal peak amplitude and all frame frequency components applied to said amplifiers are also equal. The convergence currents are then identical for all the convergence magnets 4, 5 and 6, and negligible errors of convergence remain, even in the corners.

It will be understood that the practical details of the invention may be modified to suit design considerations. The convergence magnet arrangement which is shown is of known form, but other forms of convergence means may be used.

It will also be realised that instead of using ganged amplitude controls at the outputs of the summing amplifiers 25 and 27 the same effect of an amplitude control which does not disturb the waveforms of the convergence currents can be obtained by employing ganged linear potentiometers controlling the amplitudes of the parabolic signal components of line and frame frequency prior to the combination of these components. Said components need not be combined by linear combining network means as described but may alternatively be combined by separately applying said components to respective windings on the convergence magnets said windings being so proportioned as to cause said components to exert their beam convergence effects in required ratio.

If for any reason of asymmetry sawtooth components at line and frame frequencies should be required to be present in the convergence fields for correction purposes these components may be applied respectively to the system in suitable proportions at the same points at which the parabolic components at line and field frequency are introduced. The proportion of said sawtooth components may be controlled by pre-set adjustment means.

What we claim is:

1. A circuit arrangement for controlling the dynamic convergence of a three gun cathode ray tube for displaying coloured images, comprising electromagnetic means associated with each gun which when energised by convergence currents set up magnetic fields causing convergence movements of the beams from each of said guns, two of said electromagnetic means being substantially symmetrically located with respect to the vertical plane containing the axis of the cathode ray tube, means for developing a substantially parabolic waveform of line scanning frequency, means for developing a substantially parabolic waveform of frame scanning frequency, circuit means for producing a first combination and a second combination of said parabolic waveforms, the relative amplitudes of the line and frame scanning frequency components of said first combination being different from the relative amplitudes of the line and frame frequency components of said second combination, said two electromagnetic means being responsive to said first combination to set up respective dynamic convergence magnetic fields each including components of line and frame scanning frequencies and the remaining said electromagnetic means being responsive to said second combination to set up respective dynamic convergence magnetic field including components of line and frame scanning frequencies and control means for controlling the amplitude of the resultant magnetic fields set up by said electromagnetic means substantially without changing the relative amplitudes of said magnetic field components.

2. A circuit arrangement according to claim 1 in which said circuit means includes control means for controlling the relative amplitudes of the line and frame frequency components in said first combination and in said second combination.

3. A circuit arrangement for controlling the dynamic convergence of a three gun cathode ray tube for displaying colour images comprising electromagnetic means associated with each gun which when energised by convergence currents sets up magnetic fields causing convergence movement of the beam from each of said guns, means for developing and feeding to said electromagnetic means convergence currents including components of line and frame scanning frequencies, control means for controlling the relative amplitudes of the magnetic field components set up by said components of line and frame frequencies and further control means for controlling the amplitude of the time varying components of the resultant magnetic fields set up by said convergence currents substantially without changing the relative amplitudes of said magnetic field components.

4. A circuit arrangement according to claim 3 in which said components of said convergence current are of parabolic waveform.

5. A circuit arrangement according to claim 3 in which scanning coils are provided for deflecting the beams of said tube and said coils have cosinusoidal windings and said coils are so arranged on said tube that astigmatism is substantially eliminated and in which the circuit arrangement is such that substantially the same convergence current is applied to each of said electromagnetic means.

6. A circuit arrangement for controlling the dynamic convergence of a three gun cathode ray tube for displaying coloured images, comprising electromagnetic means associated with each gun which when energised by convergence currents set up magnetic fields causing convergence movements of the beams from each of said guns, two of said electromagnetic means being substantially symmetrically located with respect to the vertical plane containing the axis of the cathode ray tube, means for developing a substantially parabolic waveform of line scanning frequency, means for developing a substantially parabolic waveform of frame scanning frequency, means for energising said two electromagnetic means by similar convergence currents in response to said waveforms to set up respective dynamic convergence magnetic fields each including components of line and frame scanning frequencies, means for energising the remaining said electromagnetic means by convergence current in response at least to said waveform of line scanning frequency to set up a respective dynamic convergence magnetic field including at least a component of line scanning frequency, and control means for controlling the amplitude of the line and frame frequency components of the time varying components of the resultant magnetic fields set up by said convergence currents substantially without changing the relative amplitudes of the line and frame frequency components.

7. A circuit arrangement according to claim 6 in which the amplitude of the magnetic field components of line scanning frequency set up by said two electromagnetic means is substantially less than the amplitude of the magnetic field components set up by the remaining said electromagnetic means.

8. A circuit arrangement according to claim 6, in which said means for energising said two electromagnetic means and said remaining electromagnetic means include control means for controlling the relative amplitudes of the line and frame frequency components of the currents by which said electromagnetic means are energised.

9. A circuit arrangement for controlling the dynamic convergence of a three gun cathode ray tube for displaying coloured images, comprising electromagnetic means associated with each gun which, when energised by convergence currents, set up magnetic fields causing convergence movement of the beam from each of said guns, scanning coils for said tube having cosinusoidal windings, said coils being so arranged on said tube that astigmatism is substantially eliminated, scanning circuits for providing said coils with line and frame frequency scanning waveforms, means for developing from the line frequency scanning waveform a substantially parabolic waveform of line scanning frequency, means for developing from the frame scanning waveform a substantially parabolic waveform of frame scanning frequency, means for energising each said electromagnetic means by substantially equal convergence currents including components responsive to said parabolic waveforms, to set up respective dynamic convergence magnetic fields which include components of line and frame scanning frequencies, and control means for controlling the amplitudes of the time varying components of the resultant magnetic fields set up by said convergence currents substantially without changing the relative amplitudes of said magnetic field components.

10. A circuit arrangement for controlling the dynamic convergence of a cathode ray tube for displaying coloured images including means for producing three scanning electron beam components, comprising three electromagnetic means associated respectively with said three beam components and which when energised by convergence currents set up magnetic fields causing convergence movements of the respective beam components, two of said electromagnetic means being substantially symmetrically located with respect to the vertical plane containing the axis of the cathode ray tube, means for developing a substantially parabolic waveform of line scanning frequency, means for developing a substantially parabolic waveform of frame scanning frequency, means for energising said two electromagnetic means by similar convergence currents in response to said waveforms to set up respective dynamic convergence magnetic fields each including components of line and frame scanning frequencies, means for energising the remaining said electromagnetic means by convergence current in response at least to said waveform of line scanning frequency to set up a respective dynamic convergence magnetic field including at least a component of line scanning frequency, and control means for controlling the amplitude of the resultant time varying magnetic fields set up by said convergence currents whilst maintaining substantially unchanged the relative amplitudes of the line and field frequency components of the respective resultant magnetic fields and whilst maintaining substantially unchanged the ratio between the amplitudes of the fields produced by said two electromagnetic means on the one hand and of the field produced by the remaining electromagnetic means on the other hand.

References Cited by the Examiner

UNITED STATES PATENTS 2,799,798 7/1957 Kratz et al. ---------- 315—27
2,820,174 1/1958 Goodrich ------------ 315—13

DAVID G. REDINBAUGH, *Primary Examiner.*

J. E. BECK, T. A. GALLAGHER, *Assistant Examiners.*